March 7, 1933.    H. ERNST    1,900,012

PROCESS OF AND APPARATUS FOR MAKING WADS

Filed Sept. 4, 1925    5 Sheets-Sheet 1

Inventor
HANS ERNST.
By John H Bruning
Attorney.

March 7, 1933.  H. ERNST  1,900,012

PROCESS OF AND APPARATUS FOR MAKING WADS

Filed Sept. 4, 1925  5 Sheets-Sheet 2

Inventor:
HANS ERNST.
John N Bruninga
Attorney.

March 7, 1933.  H. ERNST  1,900,012
PROCESS OF AND APPARATUS FOR MAKING WADS
Filed Sept. 4, 1925   5 Sheets-Sheet 3
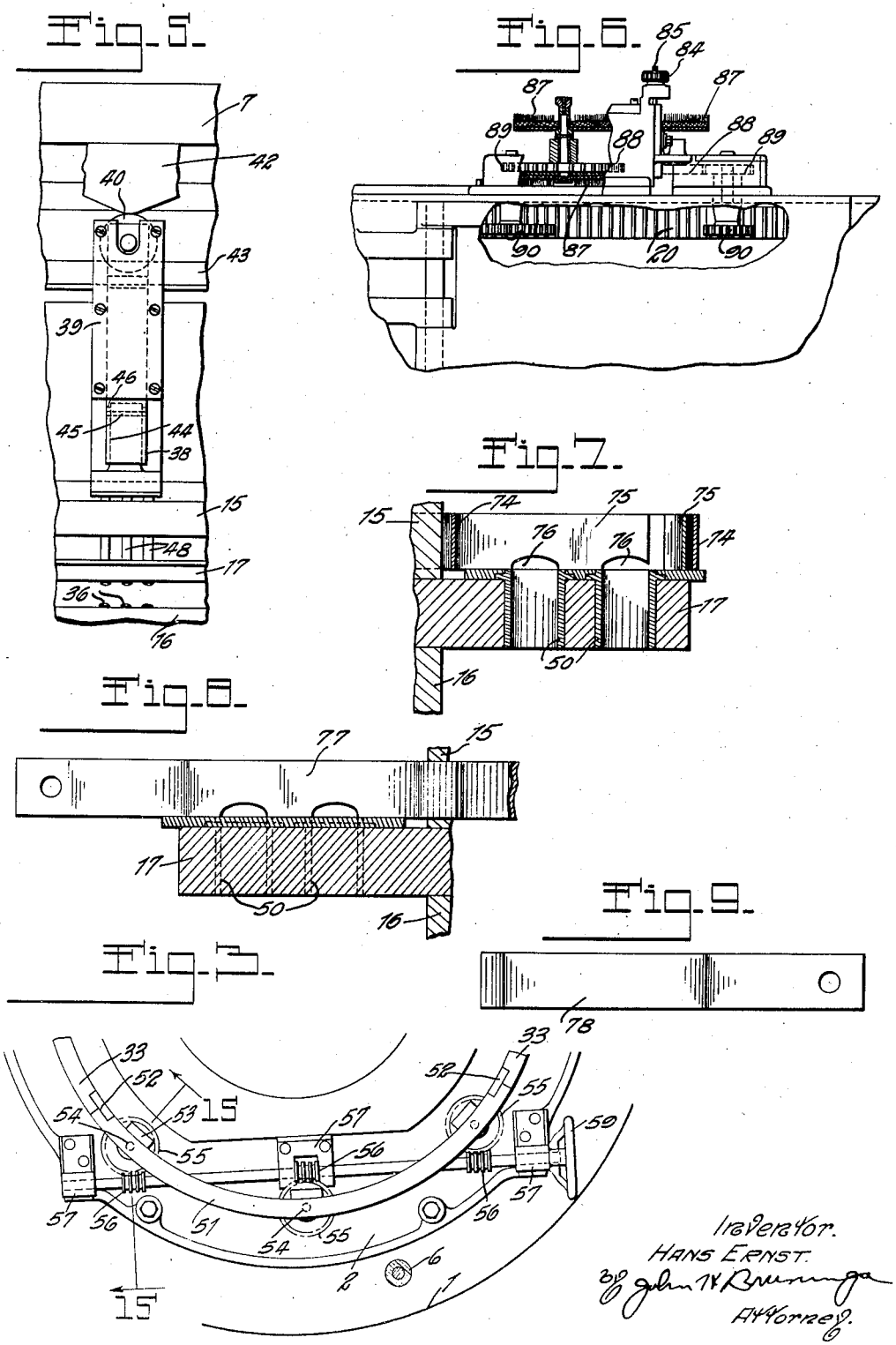

March 7, 1933. H. ERNST 1,900,012
PROCESS OF AND APPARATUS FOR MAKING WADS
Filed Sept. 4, 1925   5 Sheets-Sheet 4

Inventor
HANS ERNST.
By John N Browning
Attorney

March 7, 1933.  H. ERNST  1,900,012
PROCESS OF AND APPARATUS FOR MAKING WADS
Filed Sept. 4, 1925  5 Sheets-Sheet 5
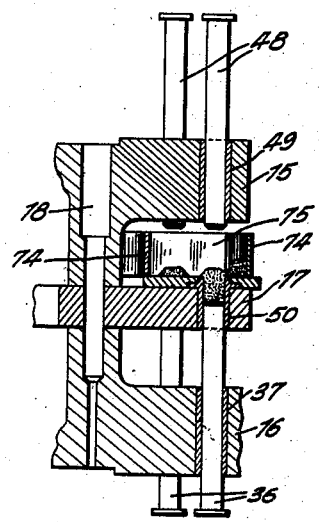
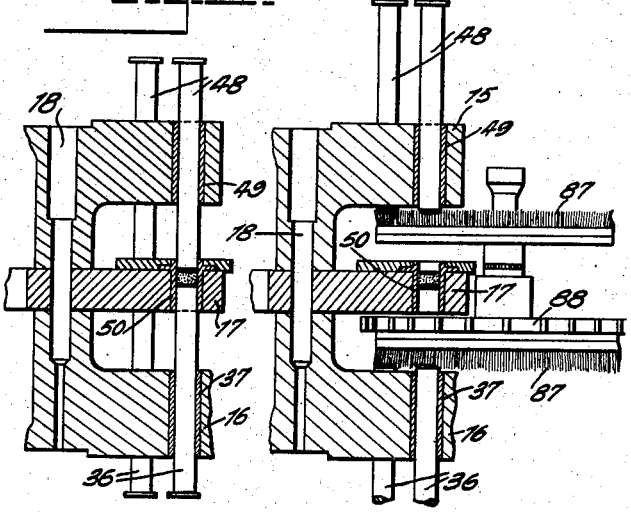
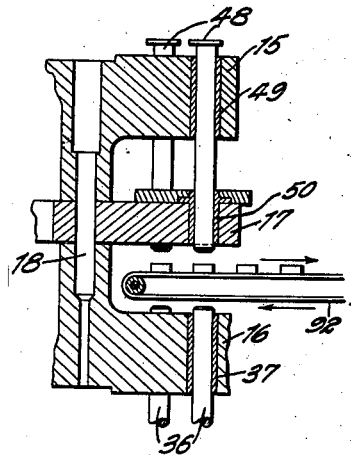
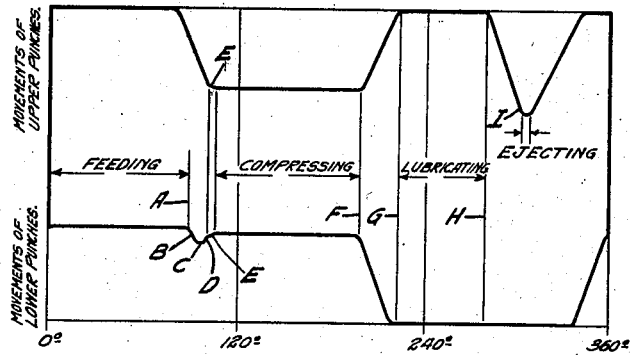
Inventor.
HANS ERNST.
John W Bruninga
Attorney.

Patented Mar. 7, 1933

1,900,012

UNITED STATES PATENT OFFICE

HANS ERNST, OF ALTON, ILLINOIS, ASSIGNOR TO WESTERN CARTRIDGE COMPANY, OF EAST ALTON, ILLINOIS, A CORPORATION OF DELAWARE

PROCESS OF AND APPARATUS FOR MAKING WADS

Application filed September 4, 1925. Serial No. 54,486.

This invention pertains to a method and apparatus for making wads such as are used in shot gun shells and the like.

The development of the art of making wads for shot gun shells and the like has shown that it is very desirable to make such wads of a material which should be not only tough and durable but also yielding and resilient, and which will retain these qualities. Materials well suited for the manufacture of such wads are frequently made up by accumulating or condensing a mass of granular material under a suitable pressure to form the wad and to cause the particles to co-here and to retain their formed shape. Certain granular materials which are suitable and desirable for the manufacture of such wads are prepared in their granular form so as to be tacky or sticky so as to promote intimate cohesion among the particles. Such sticky materials are very difficult to handle in automatic machinery such as is required for the manufacture of wads in quantity on account of their sticky nature and their tendency to pack and clog the machinery.

The preparation of a granular material suitable for this purpose and a process of making wads therefrom is fully described in application, Serial No. 695,098 filed February 25, 1924. The present invention, while adapted for operating on various other kinds of material and wads, is particularly suitable for handling the material and carrying out the process described in said application.

One of the objects of this invention, therefore, is to provide a method of making gun wads which shall be adapted to the handling of such sticky granular materials in automatic machinery.

Another object is to provide a method which will be capable of forming such materials into wads having a dense and compact structure, uniform throughout.

Another object is to provide a method by which such materials may be handled in the formation of articles entirely by automatic machinery without danger of distorting or otherwise marring the articles.

Another object is to provide mechanism by which sticky granular materials may be handled in the formation of gun wads without danger of packing of the materials or clogging of the machine.

Another object is to provide mechanism in which such materials may be handled for making wads and in which the operating parts may at all times be kept clean and free of adhering particles of the material.

Another object is to provide mechanism by which wads may be made of sticky granular materials and in which the materials may be condensed and formed to their proper shape under pressures applied in a suitable manner to render the resulting product uniform in texture.

Further objects will appear from the following description taken in connection with the accompanying drawings in which:

Figure 3 is a detail of the cam adjusting mechanism;

Figure 5 is a detail of the punch mounting;

Figure 6 is a detail view partly in section showing the cleaning mechanism;

Figures 7, 8 and 9 are details of the feeding devices;

Figures 10, 11, 12 and 13 are sectional views taken through a die illustrating successive steps in forming the wad; and Figure 14 is a diagram illustrating the movements of the upper and lower punches.

Figure 15 is a section on line 15—15 of Figure 3.

Figure 1:
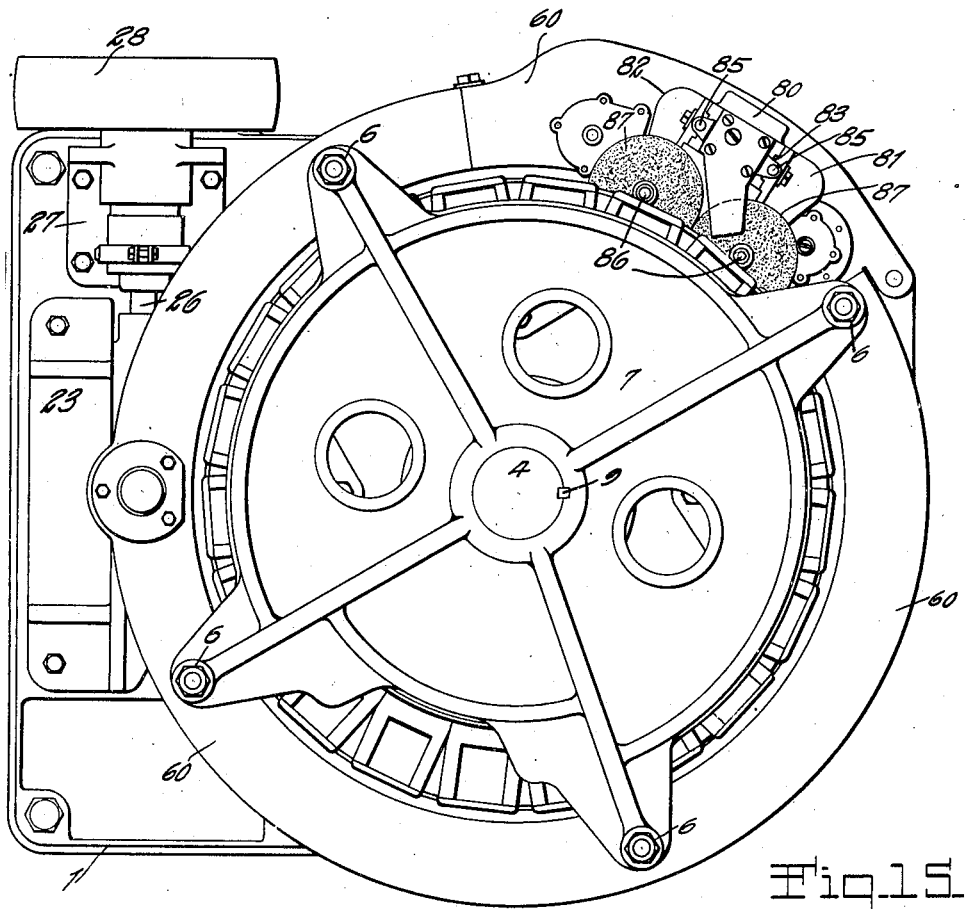
Figure 1 is a plan view of a machine embodying this invention.
Figure 2:
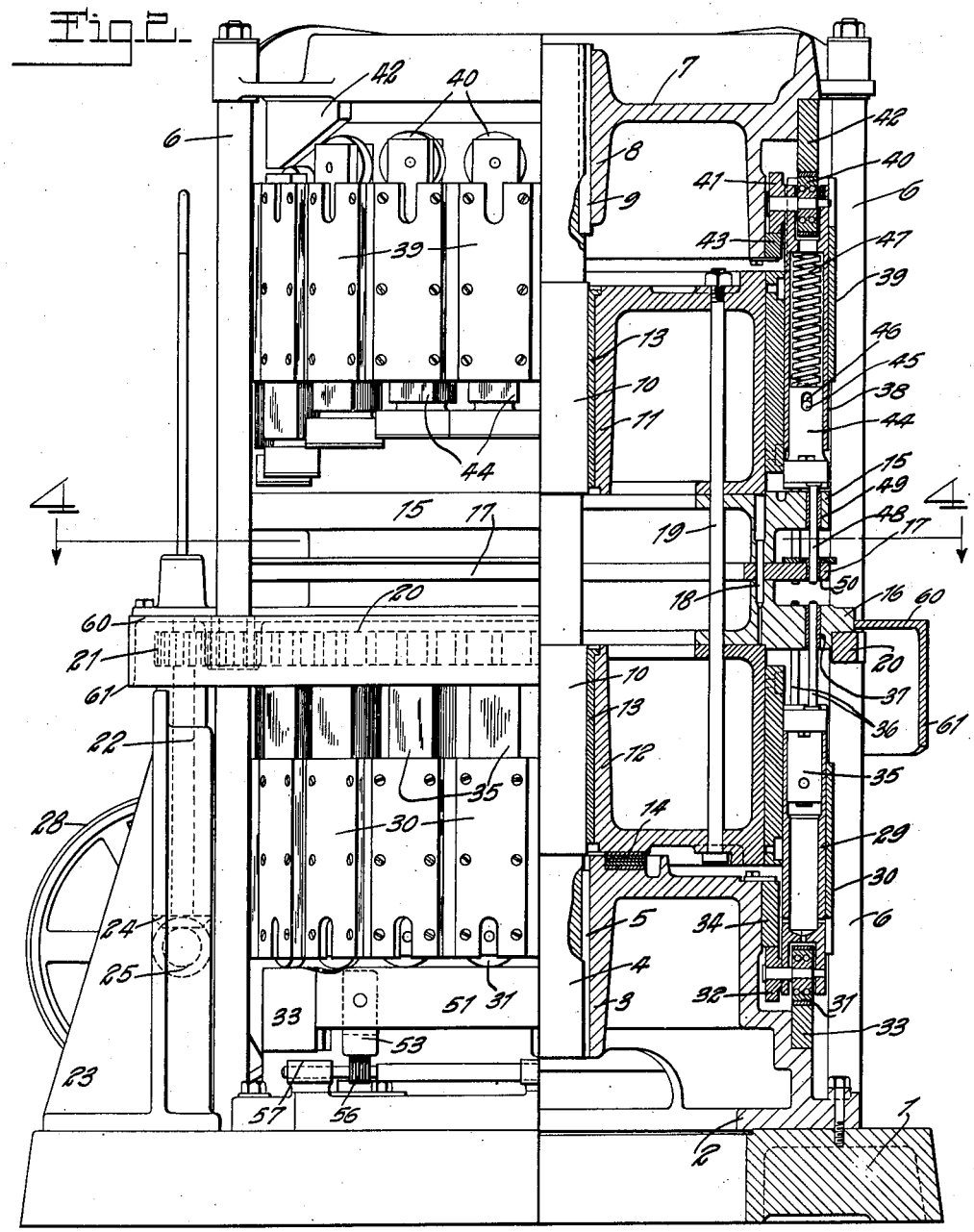
Figure 2 is a view partly in elevation and partly in section of the same machine.
Figure 16:
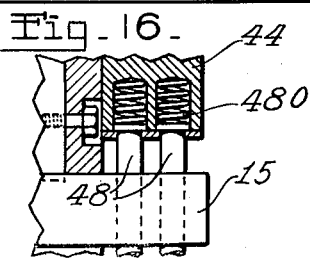
Figure 16 is a detail of the punch mounting.

Referring to the accompanying drawings 1 designates the sub-base upon which the machine is mounted. This may take the form of a cast iron ring as illustrated in Figure 2 and has mounted thereon and suitably bolted thereto a base 2. The base 2 has a central vertical socket 3 in which is mounted a vertical spindle 4 keyed to the base 2 by means of a key 5. Also mounted on the base 2 is a series of vertical columns 6 extending upwardly therefrom and carrying at their top a top plate 7. The top plate 7 is also provided with a central socket 8 adapted to receive the upper end of the spindle 4 which is keyed thereto by a key 9. The base 2, the spindle 4, the columns 6, and the top plate 7 thus constitute the main frame of the machine.

The spindle 4 is provided with a pair of journals 10 upon which are mounted for rotation upper and lower carrying rings 11 and 12 respectively, each provided with a suitable bearing sleeve 13 engaging the journal 10. The support 2 may be provided with one or more suitable bearing rings 14 upon which the carrier ring 12 rests. Mounted between the carrier rings 11 and 12 are upper and lower punch guide flanges 15 and 16 respectively and an intermediate die ring 17. The flanges 15 and 16 and the die ring 17 are maintained in accurate alinement with one another by means of a series of dowels 18, and the flanges 15 and 16 and the carrier rings 11 and 12 are bolted rigidly together by a series of vertical bolts 19. It will be seen, therefore, that the carrier rings 11 and 12 together with the guide flanges 15 and 16 and the die ring 17 are assembled to form a unitary carrier adapted to rotate on the spindle 4.

The lower guide flange 16 has mounted thereon a spur-gear 20 extending therearound and adapted to engage a pinion 21 on a vertical shaft 22 suitably journalled on a bracket 23 mounted on the sub-base 1. The shaft 22 carries at its lower end a bevel gear 24 engaging a similar gear 25 on a horizontal shaft 26 having bearings in the bracket 23 and a bracket 27, also mounted on the sub-base 1, said shaft 26 carrying at its outer end a suitable driving pulley 28. The machine is driven by a belt from any suitable source of power, not shown, engaging the pulley 28 to drive the shaft 26 and thereby the shaft 22, the pinion 21 and the gear 20, so as to rotate the carrier.

Mounted at intervals about the circumference of the lower carrier ring 12 is a series of rams 29 each mounted for vertical sliding movement in a suitable guide 30. Each ram carries at its lower end a pair of cam rolls 31 and 32 adapted for engagement respectively with stationary circular cams 33 and 34 mounted on the base 2. The cams 33 and 34 control the vertical movement of the rams 29 as the carrier rotates. Each ram 29 has fixed in the upper end thereof a block 35 having mounted thereon a group of vertical punches 36, each of said punches passing through and being guided by a sleeve 37 mounted in the lower guide flange 16. In the machine illustrated each block 35 carries a group of seven punches.

Mounted at intervals about the circumference of the upper carrier ring 11 is a series of rams 38 each mounted for sliding movement in a guide 39 and carrying at its upper end a pair of cam rolls 40 and 41 adapted for engagement respectively with stationary circular cams 42 and 43 mounted on the top plate 7. These cams 42 and 43 control the vertical movement of the rams 38 as the carrier rotates. Each ram 38 has mounted for limited movement therein at its lower end a block 44. The movement of each block 44 is limited by a pin 45 fixed in the ram and engaging a short slot 46 in the block. A spring 47, confined within the hollow ram 38, bears downwardly with a yielding pressure on the block 44. Each block 44 carries a set of downwardly extending punches 48 each passing through and being guided by a sleeve 49 mounted in the upper guide flange 15 and being cushioned by a spring 480. In the machine illustrated each block 44 carries a set of seven punches 48 corresponding with and in accurate vertical alinement with a similar set of seven punches 36 on a lower block 35.

The die ring 17 has mounted therein a series of forming dies each accurately alined with a pair of upper and lower punches 48 and 36. The upper and lower punches are thus enabled to move into and out of the dies 50 under the vertical movement imparted to them by the rams. This vertical movement, as was mentioned above, is controlled by the cams 42 and 43 for the upper rams and 33 and 34 for the lower rams so that the various punches are caused to move into and out of the dies 50 in proper sequence to form and eject the wads. These cams are relatively fixed except for a section 51 of the lower cam 33 which controls that part of the movement during which the material to form the wad is fed into the die. This section 51 is made adjustable as shown in Figures 2 and 3. The section 51 has a lapped connection 52 at its opposite ends with the main body of the cam 33. This connection is so made to allow for a vertical sliding movement of the section 51 with respect to the remaining portion of the cam. This is to adjust the position of the lower punches in the dies so as to adjust the amount of material fed to the die. The section 51 is supported by a series of brackets 53 each engaging an adjusting screw 54 carrying at its lower end a worm wheel 55 engaging a worm 56. The worms 56 are mounted on a shaft operating in suitable bearings 57 on the base 2. The end of the worm shaft may be provided with a hand wheel 59 for making the adjustment.

Mounted on the columns 6 and approximately at the height of the lower guide flange 16 is a stationary circular table 60 extending around the machine and provided with a downwardly extending apron 61 adapted to shield the operator from contact with the moving parts. Mounted on the table 60 and so as to extend outwardly therefrom is a frame 62 carrying a horizontal shaft 63 equipped at one end with a bevel gear 64 and at the other end with a grooved pulley 65. The gear 64 is adapted to engage a similar gear 66 on a vertical shaft 67 carrying at its lower end a pinion 68 engaging the gear 20 and driven thereby. This mechanism serves to drive the pulley 65 which is connected by a belt 69 with a similar pulley 70 on the opposite end of the frame 62 and which drives a roll 71 carrying, together with a roll 72 at the other end of the frame, a feed belt 73 by means of which the material is delivered to the machine. The material is delivered from any suitable source, not shown, to the belt 73 which carries it to the machine under the guide flange 15 and deposits it upon the die ring 17. At this piont in the rotation of the carrier the upper punches are raised and the lower punches have been inserted into the lower parts of the dies as illustrated in Figure 10. The material drops from the belt 73 directly on to the die ring between a pair of guides 74 opposite the inner and outer edges of the die ring and which prevent the material from falling off the ring. Mounted between the guide plates 74 and extending diagonally across the die ring from opposite sides is a series of deflectors 75 each having a notch or recess 76 in its lower edge opposite each row of dies as illustrated in Figure 7.

These deflectors serve to sweep the granular material backward and forward across the dies so as to insure the filling of each die, and the notches 76 leave a slight excess of material upstanding over the die to allow for settling of the same into the die. At the end of the guide plates 74 are special deflectors 77 also provided with notches 76 but having their ends extending to the outer edge of the die ring so as to scrape the excess material therefrom. The final deflector 78 without notches as shown in Figure 9 finally scrapes off all the excess material. This excess material thus removed is delivered through a passage 79 to any suitable receptacle not shown.

Figure 4:
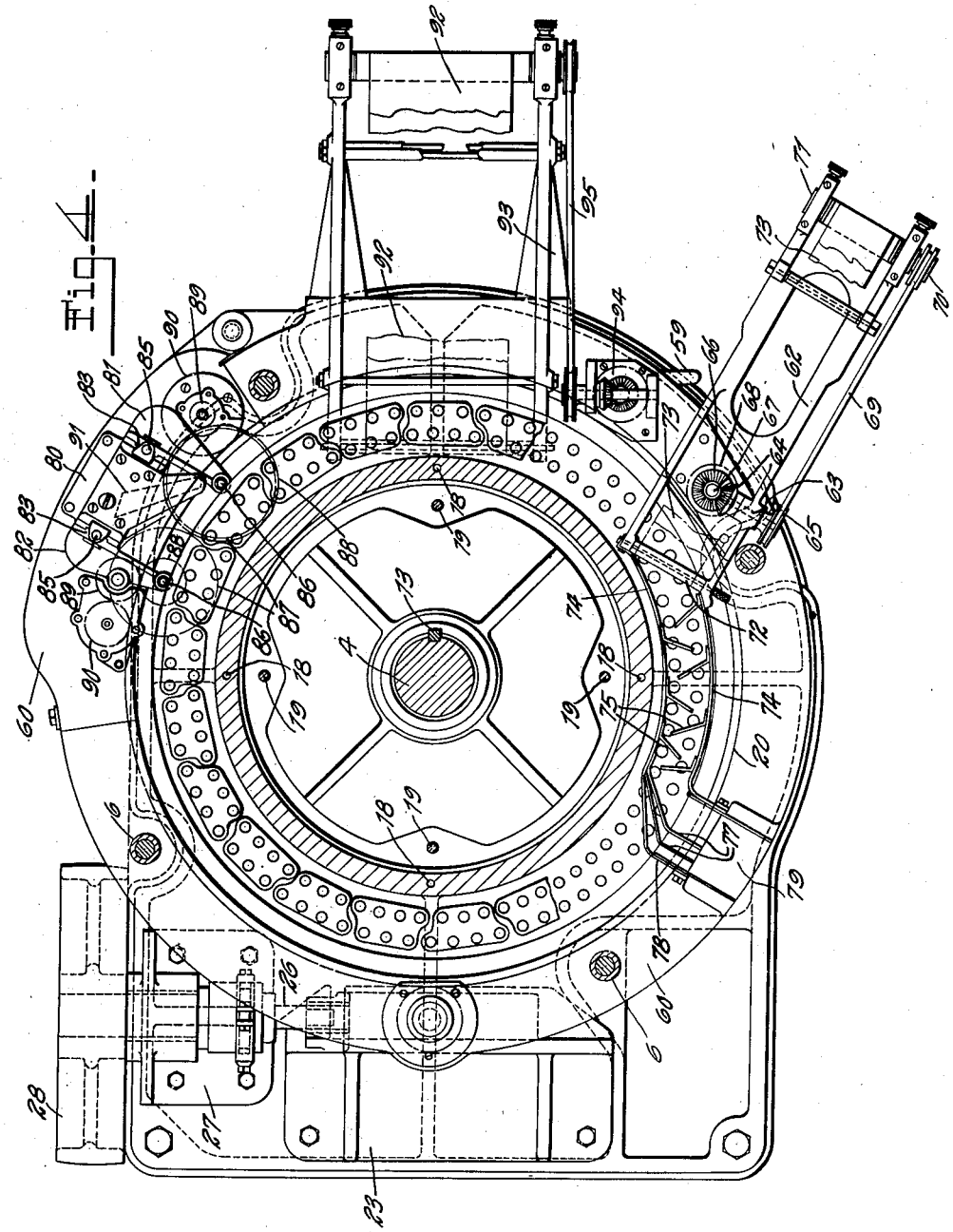
Figure 4 is a section taken on line 4—4 of Figure 2.

After the dies have been filled with material the upper punches are passed thereinto to compress the material and form the wads as will presently be more fully described. Both upper and lower punches are then withdrawn and subjected to cleaning and lubricating operations by mechanism illustrated in Figures 4, 6 and 12. Referring more particularly to Figures 4 and 6 a bracket 80 is fixed to the table 60 and has mounted thereon vertically adjustable carriers 81 and 82. These carriers are slidable along vertical ways 83 and are adjusted by a manipulative element 84 on a spindle 85. These carriers have each an inwardly projecting arm carrying at its extremity a spindle 86 having mounted for rotation thereon a pair of circular brushes 87. These brushes are driven by trains of gearing parts 88, 89 and 90 from the main gear 20. The brushes 87 are faced one upwardly and one downwardly and are mounted so as to rotate above and below the guide flanges 16 and 15 respectively as illustrated in Figure 12. The brushes rotate continuously while the machine is in operation and as the punches, in retracted position, pass by they are first brushed clean by the brushes on the bracket 82 and are then supplied with a lubricant by the brushes on the bracket 81. This lubricant in the form of oil is delivered to the brushes from a reservoir 91.

After the punches have been cleaned, and lubricated the upper punches are again passed into the dies and downwardly therethrough, forcing the wads out at the bottom thereof and dropping them upon a belt 92 carried by a frame 93 similar to the frame 62 previously described and similarly driven by gearing 94 and a belt 95. The belt 92 carries the ejected wads away from the machine and delivers them to a suitable receptacle or conveying mechanism not shown.

In the operation of this machine, therefore, the granular sticky material is delivered upon the dies where it is swept back and forth across the dies so as to fill the same. After filling the dies the excess material is removed therefrom. Prior to the filling of the dies, of course, the lower punches have been moved into the dies to a predetermined position so as to determine the amount of material which will be contained in each die at the beginning of the formation of the wad. The upper punches are then brought downward into the die to compress the material. The diagram of Figure 14 illustrates the relative movement of the upper and lower punches. The first interval up to the point "A" is occupied in feeding the material. At this point the upper punches descend into the dies and at the same time the lower punches recede somewhat as illustrated at "B". During the period "B" both upper and lower punches are descending and the mass of material is being carried downwardly in the die. The lower punch then ceases to recede for a short period at "C" and then rises slightly as shown at "D". This slight rise of the lower punch tends to compact the material adjacent to that punch to a degree corresponding with that which has been impressed upon the material adjacent the upper punch by its descent. During the next short interval both upper and lower punches move into the die approaching each other by approximately an equal amount as shown at "E". This movement compresses and compacts the material equally from opposite sides. There is now a period from "E" to "F" during which the upper and lower punches remain relatively stationary and a constant compression of the material is maintained. This period of constant pressure permits the particles of the material to properly pack together and assume stable positions. Both sets of punches are now withdrawn from the die during the interval from "F" to "G", the formed wad being left in the die as illustrated in Figure 12. During the next period from "G" to "H" the retracted punches pass the cleaning and lubricating brushes and, having had any material particles which may have adhered thereto brushed off, are supplied with lubricant. The upper punches are now brought down into and through the die as indicated at "I" so as to eject the formed wad and drop the same upon the belt below as shown in Figure 13.

It will be seen, therefore, that in accordance with this invention a method of forming wads or similar articles from sticky granular material is provided. The feeding of the material is accomplished without compression or forced handling of any kind, the material simply feeding into the dies by gravity. There is thus measured out in each die an assembled wad portion of the material just sufficient to properly form a single wad. The arrangement of the baffles provides for sweeping the material back and forth in a circuitous path across the dies so that each is properly filled. This measured quantity of material is then compressed between the opposed punches. It will be noted that the upper punch applies a yielding pressure, and that the lower punch, first recedes, while still sustaining the wad material, so that the material is preliminarily condensed. During this time also the material, while being compacted, is moved bodily into the die. Thereafter the lower punch moves upwardly so as to compact the material at the lower part of the wad; and then both punches move together so as to finally condense the material. This compression is arranged to take place from both sides of the wad to a substantially equal extent as provided by the movement "B", "C", "D" and "E" of the punches. The wad is, therefore, equally dense at both surfaces and, therefore, of more uniform texture throughout. The extended period of constant pressure insures stabilization of the particles within the material so that the wad will maintain its shape. The springs 480 act to distribute the pressure of the ram equally among the individual punches. The various wad portions are, therefore, individually compressed, and the pressure on each portion may be controlled and adjusted by adjusting the strength of the spring 480. Duplicate springs may be used, so that substantially the same pressure is applied to each portion. Provision for wiping and lubricating the punches insures freedom from adhering particles, prevents adhesion of the wad to the punch and insures smooth action and clean dies. It will be noted that the completed wads are ejected by dropping them downwardly upon a conveyor. There is thus no action of the ejector mechanism which can in any way injure or mar the finished product.

It is obvious that various changes may be made in the details of construction without departing from the spirit of this invention; it is to be understood, therefore, that this invention is not to be limited to the specific details shown and described.

Having thus described the invention what is claimed is:

1. In the art of making cartridge wads, the process comprising, assembling a wad portion in a die, moving a punch into the die while an opposed punch recedes in the die and next moving the opposed punch forward in the die.

2. In the art of making cartridge wads, the process comprising, assembling a wad portion in a die, forcing a punch into the die, withdrawing the punch, wiping the punch, and passing the punch through the die.

3. A machine for making gun wads, comprising a die, opposed punches, means for causing one of said punches to recede in said die, while the other punch moves into said die, and means for next moving the receded punch forward in said die.

4. A machine for making gun wads, comprising, a die, opposed punches, means for feeding material to said die, means for moving one of said punches into said die while the opposed punch recedes in order to pack the material, and means for moving the receded punch in said die to condense the material.

5. A mechanism of the character described, comprising, a die, means for feeding material thereto, a punch movable into said die to compact the material therein to form a wad, means for cleaning said punch after such wad formation and means for moving said cleaned punch through said die to eject the formed wad.

6. A machine for making gun wads, comprising, a die, means for feeding material thereto, a punch movable into said die to compact the material therein to form a wad and movable out of said die after such wad formation, means adapted to wipe the end of said punch when withdrawn from said die, and means for moving said wiped punch through said die to eject the formed wad.

7. A machine of the character described, comprising, a carrier, a die thereon, means for feeding the material on said carrier and to said die, a punch on said carrier and movable into said die to compact the material therein to form a wad, a conveyor beneath said carrier and means for moving said punch through said die to eject the formed wad onto said conveyor.

8. A machine for making gun wads, comprising, a movable carrier, a die thereon, means for feeding the material on said carrier and to said die, opposed punches on said carrier and movable into said die to compact the material therein, means for moving said punches into and out of said die, and separately driven wiping means mounted to pass between said punches and said die upon movement of said carrier.

9. A machine of the character described, comprising, a carrier, a series of dies thereon, means for feeding the material on said carrier and to said dies, a series of punches movable into said dies to compact the material to form wads, a conveyor beneath said dies, means for moving said carrier relative to said conveyor, and means for moving said punches through said die to eject the wads on said conveyor.

10. A machine for making gun wads, comprising, a carrier, a series of dies thereon, means for feeding the material on said carrier and to said dies, a series of punches movable into said dies to compact the material, separately driven punch wiping means mounted to pass between said punches and said dies upon movement of said carrier, and means for moving said carrier relative to said wiping means.

11. A machine for making gun wads, comprising, a carrier, a series of dies thereon, means for feeding the material on said carrier and to said dies, sets of opposed punches movable into said dies to compact the material therein, means for moving said punches into and out of said dies, separately driven wiping means mounted to pass between said punches and said dies upon movement of said carrier, and means for moving said carrier relative to said wiping means.

12. In the art of making cartridge wads, the process comprising, assembling a portion of a cartridge wad-forming material, and applying active condensing pressures to both faces of the wad portion whereby to condense and finish both faces of the wad.

13. In the art of making cartridge wads, the process comprising, preliminarily condensing the material, and subsequently applying active pressures to both faces of the wad portion whereby to condense and finish both faces of the wad.

14. In the art of making cartridge wads, the process comprising, applying active pressures to both faces of the wad portion and maintaining such pressures for an extended period whereby to condense and finish both faces of the wad.

15. In the art of making cartridge wads, the process consisting in preliminarily condensing the material, applying active pressures to both faces of the wad portion, and maintaining such pressures for an extended period whereby to condense and finish both faces of the wad.

16. In the art of making cartridge wads, the process comprising, feeding material to a die, compressing the material, moving the material bodily within the die, and finally applying positive condensing pressures to both sides of the material.

In testimony whereof I affix my signature this 4th day of June, 1925.

HANS ERNST.